United States Patent
Anota et al.

(10) Patent No.: US 9,526,367 B2
(45) Date of Patent: Dec. 27, 2016

(54) COOKING UTENSIL FOR COOKING FOOD UNDER PRESSURE THAT HAS AN IMPROVED CONTROL DEVICE

(71) Applicant: SEB S.A., Ecully (FR)

(72) Inventors: Daniel Jean Marie Anota, Dijon (FR); Eric Chameroy, Veronnes (FR); Herve Eugene Rene Blanc, Dijon (FR)

(73) Assignee: SEB S.A., Ecully (FR)

( * ) Notice: Subject to any disclaimer, the term of this patent is extended or adjusted under 35 U.S.C. 154(b) by 562 days.

(21) Appl. No.: 13/942,046

(22) Filed: Jul. 15, 2013

(65) Prior Publication Data

US 2014/0013960 A1  Jan. 16, 2014

(30) Foreign Application Priority Data

Jul. 16, 2012  (FR) ...................................... 12 56841

(51) Int. Cl.
| | | |
|---|---|---|
| *A47J 27/08* | (2006.01) | |
| *A47J 37/12* | (2006.01) | |
| *B65D 45/00* | (2006.01) | |
| *F16J 13/24* | (2006.01) | |
| *A47J 36/20* | (2006.01) | |
| *A47J 36/06* | (2006.01) | |

(52) U.S. Cl.
CPC ......... *A47J 27/0804* (2013.01); *A47J 27/0813* (2013.01); *A47J 36/06* (2013.01); *A47J 36/20* (2013.01); *F16J 13/24* (2013.01)

(58) Field of Classification Search
CPC ........ A47J 27/0813; A47J 27/62; A47J 27/18; A47J 27/0817; A47J 27/004; A47J 37/0814; A47J 37/0611; A47J 45/068; A47J 36/20; A47J 36/06; A23B 7/144; B01D 11/0203; B60K 15/0406; F01P 11/0238; F16J 13/20; F16J 13/24; F16J 13/06
USPC ......... 99/337, 338, 342, 403, 325, 330, 331, 99/467; 220/203.01, 203.2, 203.07, 220/203.28, 314, 316, 912, 325; 219/440, 219/439
See application file for complete search history.

(56) References Cited

U.S. PATENT DOCUMENTS 5,613,424 A * 3/1997 Chameroy .......... A47J 27/0813
                                                    220/316
5,678,721 A * 10/1997 Cartigny ................. A47J 27/09
                                                    220/293

(Continued)

FOREIGN PATENT DOCUMENTS

| CN | 101524242 A | 9/2009 |
|---|---|---|
| WO | 0016672 A1 | 3/2000 |
| WO | 2009098317 A1 | 8/2009 |

*Primary Examiner* — Dana Ross
*Assistant Examiner* — Hemant Mathew
(74) *Attorney, Agent, or Firm* — The Webb Law Firm

(57) ABSTRACT

Provided is a utensil for cooking food under pressure including: a vessel and a lid; at least one locking member mounted to move on the lid between a locking position and an unlocking position; a control device for controlling the movement of the locking member, including an operating member suitable for being actuated by a user in such a manner as to cause the locking member to move; wherein the locking member is mounted on the lid in such a manner as to be urged by positioning resilient return means towards its locking position; and the operating member is mounted to be drivingly linked to the locking member in a manner such that the action by the user on the operating member causes the locking member to move towards its unlocking position.

13 Claims, 2 Drawing Sheets

(56) References Cited

U.S. PATENT DOCUMENTS

| | | | | |
|---|---|---|---|---|
| 6,019,029 A | * | 2/2000 | Chan | A47J 27/0813 220/293 |
| 2005/0132894 A1 | * | 6/2005 | Seurat Guiochet | A47J 27/092 99/337 |
| 2005/0132896 A1 | * | 6/2005 | Seurat Guiochet | A47J 27/0806 99/337 |
| 2005/0139089 A1 | * | 6/2005 | Seurat Guiochet | A47J 27/0813 99/403 |
| 2005/0178274 A1 | * | 8/2005 | Cartigny | A47J 27/0813 99/337 |
| 2005/0284305 A1 | * | 12/2005 | Angue | A47J 27/0808 99/337 |
| 2006/0054026 A1 | * | 3/2006 | Seurat Guiochet | A47J 27/09 99/337 |
| 2011/0147365 A1 | * | 6/2011 | Pellerin | A47J 27/004 219/440 |

* cited by examiner

COOKING UTENSIL FOR COOKING FOOD UNDER PRESSURE THAT HAS AN IMPROVED CONTROL DEVICE

CROSS-REFERENCE TO RELATED APPLICATIONS

This application claims priority under 35 U.S.C. §119(a)-(d) to French Application No. 1256841, filed on Jul. 16, 2012, the disclosure of which is hereby incorporated by reference in their entireties.

BACKGROUND OF THE INVENTION

Field of the Invention

The present invention relates to the general technical field of cooking utensils for cooking food under pressure, in particular such utensils for household use, such a utensil having at least one vessel and a lid designed to be mounted on the vessel to form a sealed cooking enclosure, such utensils being designed to enable food contained in the vessel to be cooked under steam pressure.

The present invention thus relates more particularly to a utensil for cooking food under pressure, said utensil including at least:
- a vessel and a lid that is designed to be mounted on said vessel to define a sealed cooking enclosure;
- at least one locking member mounted to move on the lid between a locking position in which the lid is locked on the vessel and an unlocking position in which the lid can be taken off the vessel;
- a control device for controlling the movement of said at least one locking member, which control device includes an operating member suitable for being actuated by a user in such a manner as to cause said at least one locking member to move, said operating member being mounted in such a manner as to able to be moved.

Naturally, such pressure cooking utensils for cooking food under pressure are already known, in particular for household use, such as pressure cookers that are provided with locking members, e.g. jaws, mounted to move in radial translation on the lid between a locking position in which the lid is locked on the vessel and an unlocking position in which the lid can be taken off the vessel.

In pressure cookers of this type, a control device for controlling the movement of the jaws is provided so that the user can control the radial movement of the jaws and cause them to move radially. Known pressure cookers of this type generally implement a control device for controlling the movement of the jaws that includes an operating member accessible to the user so that said user can, by actuating the operating member, cause the jaws to move radially towards their unlocking position or towards their locking position respectively for opening the pressure cooker and removing the lid, or for locking the lid onto the vessel before the start of the cooking cycle.

Known control devices and operating members incorporated in such control devices generally implement two distinct operating members respectively for opening and then for closing the jaws, and incorporating either rotary buttons/knobs or push buttons. For example, known devices implement a control device including an operating button that is actuated substantially vertically for unlocking the locking members, which button is combined with a push button that is actuated radially for performing the unlocking.

The presence of two operating members naturally complicates the drive train of the control device and also ultimately leads to ergonomics that can be complex for users who are constrained to combine control and actuation movements that are of various levels of sophistication and that can be tedious to memorize and can even give rise to operating errors.

Known control devices may also require the user to exert considerable force in order to move the jaws or in order to unlock the jaws, thereby constituting another drawback of currently known devices.

Objects assigned to the invention are therefore to remedy the various above-mentioned drawbacks and to propose a novel pressure cooking utensil for cooking food under pressure that makes it possible to simplify the control for locking and for unlocking the lid on the vessel.

Another object of the invention is to propose a novel pressure cooking utensil for cooking food under pressure that makes it possible to control the locking/unlocking of the jaws in a manner that is entirely safe for the user.

Another object of the invention is to propose a novel pressure cooking utensil that makes it possible to lock/unlock the lid in a manner that is particularly ergonomic and without having to exert large operating forces.

SUMMARY OF THE INVENTION

The objects assigned to the invention are achieved by means of a cooking utensil for cooking food under pressure, said utensil including at least:
- a vessel and a lid that is designed to be mounted on said vessel to define a sealed cooking enclosure;
- at least one locking member mounted to move on the lid between a locking position in which the lid is locked on the vessel and an unlocking position in which the lid can be taken off the vessel;
- a control device for controlling the movement of said at least one locking member, which control device includes an operating member suitable for being actuated by a user in such a manner as to cause said at least one locking member to move, said operating member being mounted in such a manner as to able to be moved;
said utensil being characterized in that:
- said at least one locking member is mounted on the lid in such a manner as to be urged by positioning resilient return means towards its locking position so that the locking position corresponds to a rest position of the locking member; and
- the operating member is mounted to be drivingly linked to said at least one locking member in a manner such that the operating member takes up a stable rest position corresponding to said locking position and that action by the user on the operating member against action from the resilient return means causes the locking member to move towards its unlocking position, which position is unstable.
- the cooking utensil is provided with at least one locking valve mounted on the lid and suitable, under the effect of the pressure prevailing inside the utensil, for taking up a sealing high position and a leakage low position, said locking valve being mounted so that, when said at least one locking member is in the locking position, it is free to take up its high position, thereby locking said at least one locking member in its locking position.

BRIEF DESCRIPTION OF THE DRAWINGS

Other features and advantages of the invention appear and can be seen more clearly on reading the following description with reference to the accompanying drawings, given merely by way of non-limiting illustration, and in which:

As shown in FIGS. 1 to 5, the pressure cooking utensil 1 of the invention for cooking food under pressure, which utensil is, in this example, a domestic-use pressure cooker, includes at least one vessel 2 and a lid 3 that is designed to be mounted on the vessel 2 to form a sealed cooking enclosure.

Figure 2:
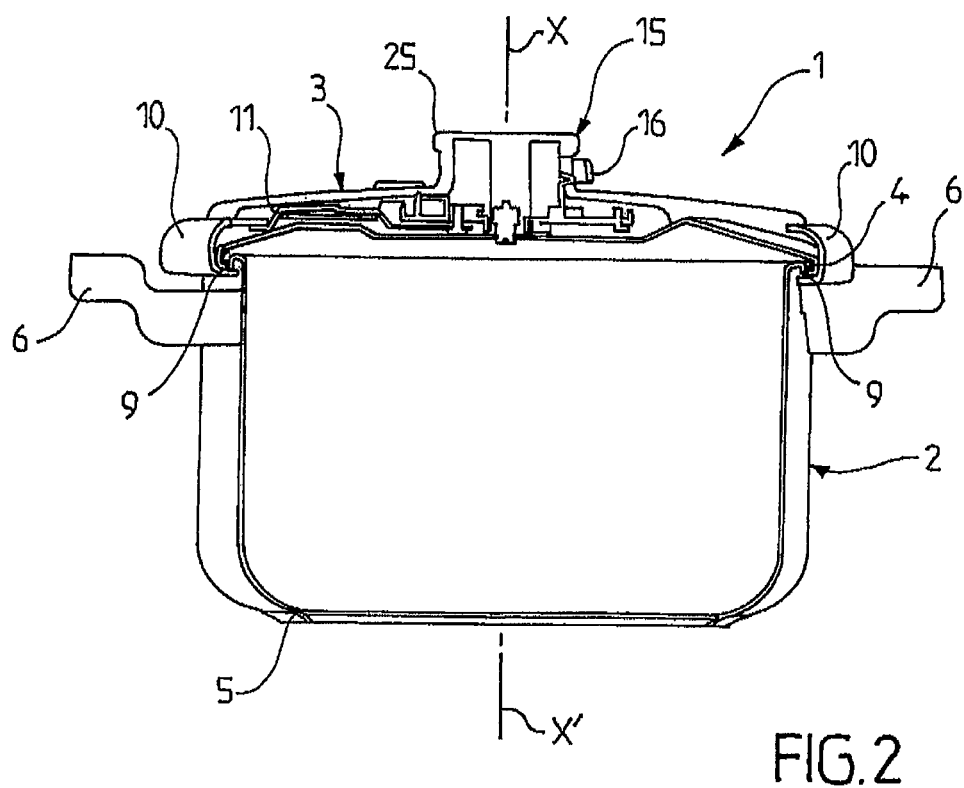
FIG. 2 is a view in cross-section, showing a pressure cooking utensil of the invention for cooking food under pressure.

In the example shown, in particular, in FIG. 2, given merely by way of illustration, the pressure cooking utensil 1 of the invention for cooking food under pressure includes a vessel 2 that is of substantially cylindrical shape, of axis of symmetry and of revolution X-X' and a lid 3 of substantially circular shape that is mounted in sealed manner on the vessel 2, at the top opening of said vessel, via an annular lip-seal gasket 4.

Naturally, by way of a variant, the pressure cooking utensil for cooking food under pressure may have any shape other than circular, it being possible, for example, for the vessel 2 and for the lids 3 to be egg-shaped, for example.

The vessel 2 and the lid 3 are made, in known manner, from a metal material such as stainless steel, the vessel 2 having a bottom 5 suitable for diffusing heat and that is secured to the vessel 2, e.g. by hot stamping.

The vessel 2 is also provided with handles 6 for taking hold of it, e.g. with two handles projecting substantially radially outwards from the utensil, it being understood that, in the meaning of the invention, the "radial" direction is defined relative to the axis XX' of the utensil that is substantially vertical when the utensil is in its normal operating position.

In addition, in the meaning of the invention, a distinction is made between the inward radial direction corresponding to a radial direction extending towards the center of the utensil towards its axis XX' and the outward radial direction extending towards the outside of the utensil, i.e. away from the axis X-X'.

As shown in the figures, the lid 3 is in the form of a circular metal disk of shape and of thickness having characteristics suitable for imparting good resistance to pressure during operation of the utensil.

As also shown, the food cooking utensil 1 of the invention has at least one operating valve 7, the sensitivity of which is, for example, adjustable by the user between various pressure settings, said operating valve being mounted on the lid 3 via a through hole enabling said valve to slide freely in reaction to the pressure level prevailing in the enclosure.

Figure 1:
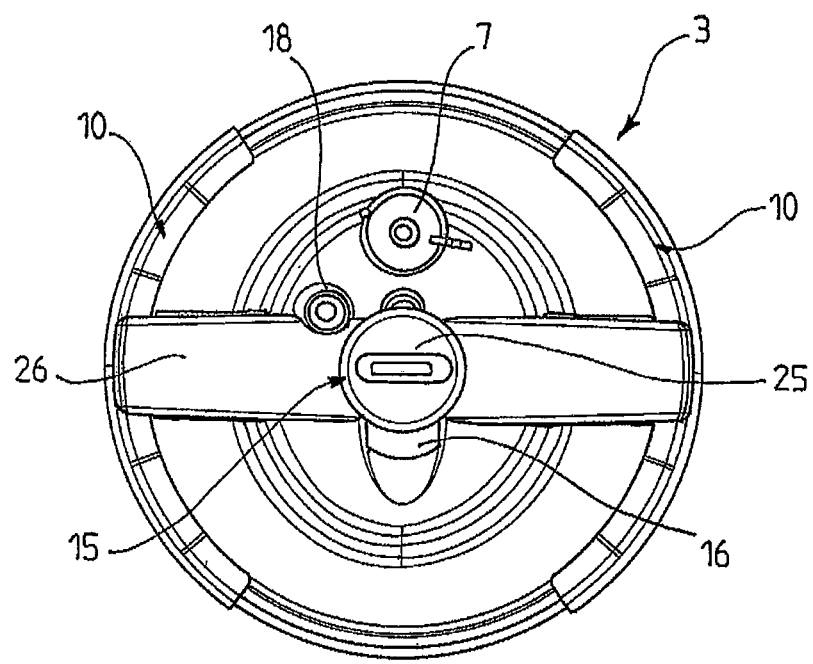
FIG. 1 is a view from above the lid, showing a food cooking utensil of the invention.
Figure 4:
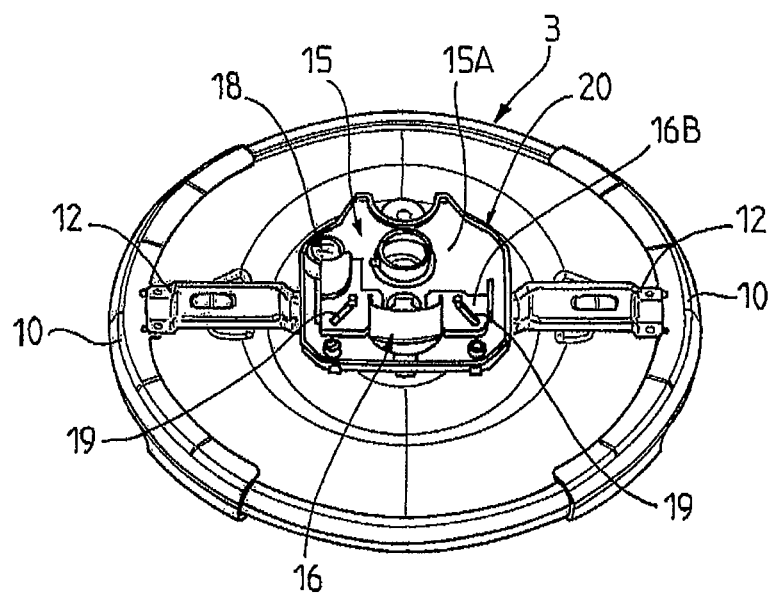
FIGS. 4 and 5 are perspective views from above, showing a lid of a pressure cooking utensil of the invention for cooking food under pressure, provided with locking/unlocking jaws respectively in the locking position and in the unlocking position.

The pressure cooking utensil 1 of the invention for cooking food under pressure also includes at least one locking member 10 mounted to move on the lid 3 between a locking position (FIGS. 1 and 4) in which the lid 3 is locked on the vessel 2 and an unlocking position (FIG. 5) in which the lid 3 can be taken off the vessel 2.

As shown in the figures, and in a preferred variant of the invention, said at least one locking member 10 is mounted to move in radial translation on the lid 3. However, it is possible, without going beyond the ambit of the invention, to mount said at least one locking member 10 to move with some other movement, e.g. in rotation on the lid 3.

As shown in the figures, and merely by way of example, said at least one locking member 10 is formed by a jaw that is advantageously in the form of a channel-section metal plate that is in the shape of a circular arc or of a segment in such a manner as to be suitable for coming to clamp around the dropped peripheral top edge 9 of the vessel 2 in a manner well known to the person skilled in the art. By way of a variant that is not shown, the locking member 10 could be made up of radial segments coming to lock around the lid, through suitable orifices, by them moving in radial translation in the outward and inward directions.

However, in a preferred variant of the invention, one or more locking members 10 in the form of circularly arcuate jaw(s) are used, said at least one locking member 10 thus preferably being formed by at least one jaw.

Even more preferably, and as shown in the figures, the food cooking utensil of the invention includes, as a locking member, at least two jaws that are mounted diametrically opposite from each other on the lid 3, each jaw being secured to a drive arm 11 extending radially towards the center of the lid 3 from the jaw.

The drive arms 11 are advantageously guided over the top surface of the lid 3 and are connected via one end 12 to the corresponding jaw 10 in its central portion, e.g. by crimping, and via the other end 13 to a control device 15 via drive pins 14.

Thus, the cooking utensil 1 of the invention for cooking food under pressure also has at least one control device 15 for controlling the movement of said at least one locking member 10, said control device 15 including an operating member 16 suitable for being actuated by a user in such a manner as to cause said at least one locking member 10 to move, said operating member 16 being mounted to be movable.

As shown in the figures, and in a preferred variant of the invention, the operating member 16 is mounted to be movable in radial translation on the lid 3. Without going beyond the ambit of the invention, the operating member 16 may be mounted to move in translation in other geometrical configurations and, for example, in such a manner as to be moved on the lid 3 in an axial or inclined direction.

Figure 3:
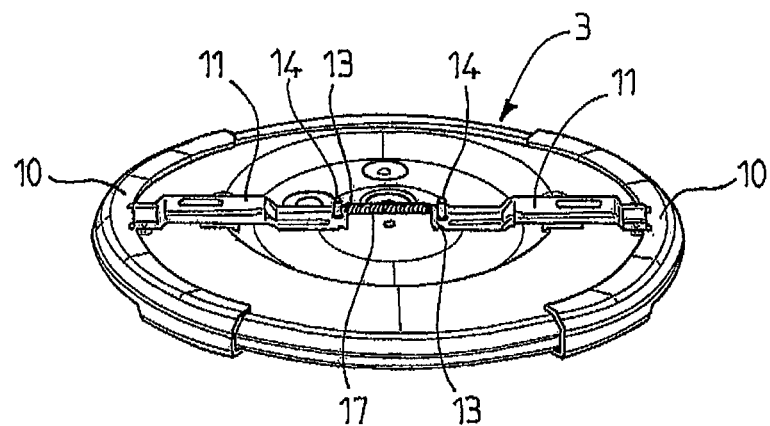
FIG. 3 is a perspective view from above, showing a detail of an embodiment of a lid of a food cooking utensil of the invention.

As shown, in particular in FIG. 3, and in accordance with an important characteristic of the invention, said at least one locking member 10 is mounted on the lid 3 in such a manner as to be urged by positioning resilient return means 17 towards its locking position so that the locking position corresponds to a rest position of the locking member 10.

In addition, the operating member 16 is mounted to be drivingly linked to said at least one locking member 10 in a manner such that the operating member 16 takes up a stable rest position corresponding to said locking position and that action by the user on the operating member 16 against action from the resilient return means 17 causes the locking member 10 to move towards its unlocking position, which position is unstable.

The drive linkage arrangement of the invention thus makes it possible to urge said at least one locking member 10 continuously towards its stable rest position since said at least one locking member 10 bears, in particular against the periphery of the lid 3, by means of the return action exerted in the inward radial direction by the positioning resilient return means 17.

This arrangement requires that, while the operating member 16 is being actuated, e.g. by pressing radially inwards, said at least one locking member 10 can slide in the outward radial direction so as to take up its unlocking position (FIG. 4), and so that merely releasing the operating member 16 enables the locking member 10 to lock automatically onto the vessel 2 under the action of the resilient return means 17.

Such an arrangement makes it possible to obtain utensil operating ergonomics that are particularly simple because they involve only one single operating member that is suitable for being activated positively by the user, namely the operating member 16, thereby also simplifying the operating actions required and facilitating memorizing the actions related to locking/unlocking the utensil.

The arrangement proposed is particularly simplified insofar as the unlocking position is not a stable position, thereby simplifying the control mechanism, this unstable position being maintained only if the user maintains a positive action, i.e. exerts a sufficient and necessary minimum force on the operating member 16 against the resilient return means 17.

According to another characteristic of the invention, the cooking utensil is provided with at least one locking valve 18 mounted on the lid 3 and suitable, under the effect of the pressure prevailing inside the utensil, for taking up a sealing high position and a leakage low position, said locking valve 18 being mounted so that, when said at least one locking member 10 is in the locking position 10, it is free to take up its high position, thereby locking said at least one locking member 10 in its locking position on the vessel 2.

This construction configuration is obtained by providing a hole through the lid 3 at a suitable place so that the locking valve 18 can react to the pressure building up in the utensil and move in the height direction and prevent the operating member 16 from moving. This makes it possible to avoid any risk of the locking member 10 unlocking while the utensil is operating, and while, inside the enclosure, there remains an internal operating pressure greater than atmospheric pressure.

Preferentially, and as shown in the figures, the locking valve 18 is disposed on the lid 3 in such a manner as to come to interfere with the operating member 16 in order to block its position and its possibility of moving radially in translation.

By way of a variant, the locking valve 18 can, nevertheless, be disposed at some other place on the lid 3, e.g. in a manner such as to come to interfere with the drive arm 11.

As shown in the figures and when the cooking utensil 1 of the invention includes at least two jaws that are mounted diametrically opposite from each other on the lid, each jaw being secured to a drive arm 11 extending radially towards the center of the lid 3 from the jaw 10, the resilient return means 17 are interposed between the two drive arms 11.

As shown, the resilient return means 17 are preferably interposed between the two ends 13 of each of the two drive arms 11.

In particularly advantageous manner, the resilient return means 17 are constituted by a traction spring that, as shown, is interposed in a radial direction corresponding to the longitudinal direction of the two drive arms 11.

In advantageous manner, the operating member 16 is a push-button making it possible to cause said at least one locking member 10 to move in the inward radial direction and in the outward radial direction.

In general manner, the control device 15 includes a deck 20, made, for example, of a heat-resistant plastics material, such as polybutylene terephthalate (PBT), and provided with the cutouts and orifices necessary for accommodating the movement and the control of the control valve 7, of the locking valve 18 and of any other members of the utensil. The operating member 16 is mounted to move in radial translation on the plate 20 by sliding, and it co-operates with the drive arms 11 to cause them to move.

As shown, the operating member 16 has a radially projecting actuation top zone 16A that is extended at a lower level by a control plate 16B that bears against the top face 15A of the deck 20 so as to move in radial translation over said face 15A.

The control plate 16B is provided with two slanting slots 19 accommodating the drive pins 14 and in which they slide. By means of this drive linkage, the radial movement of the operating member 16 causes the drive pins 14 secured to the drive arms 11 to move. By moving radially in a direction perpendicular to the movement of the operating member 16, said drive arms 11 cause the locking members 10 to move towards their locking position or their unlocking position.

Advantageously, the control device 15 also has a raised central zone 25 for making it easier to take hold of the lid 3 in the hand, which zone is, for example; in the shape of a knob, in register with and below which the operating member 16 extends radially.

By means of this configuration, the user can easily take hold of the lid 3 by grasping the raised central zone 25 between the index finger and the thumb in such a manner as to be able to actuate the operating member 16 with the thumb.

The cooking utensil of the invention is also provided with pieces of trim 26 that come to cover and mask the drive arms 11 and the deck 20. By way of a variant (not shown), the piece of trim 26 may be in the form of a transverse bar, e.g. made of a plastics material, e.g. PBT, covering the drive arms 11 and the deck 20 and incorporating the raised central zone 25 in which the operating member 16 is mounted to slide. A one-piece piece of trim 26 is thus obtained, it being understood that, in its simplest form, the piece of trim 26 covers the drive arms 11 and the deck 20 and incorporates the raised central zone 25.

Figure 5:
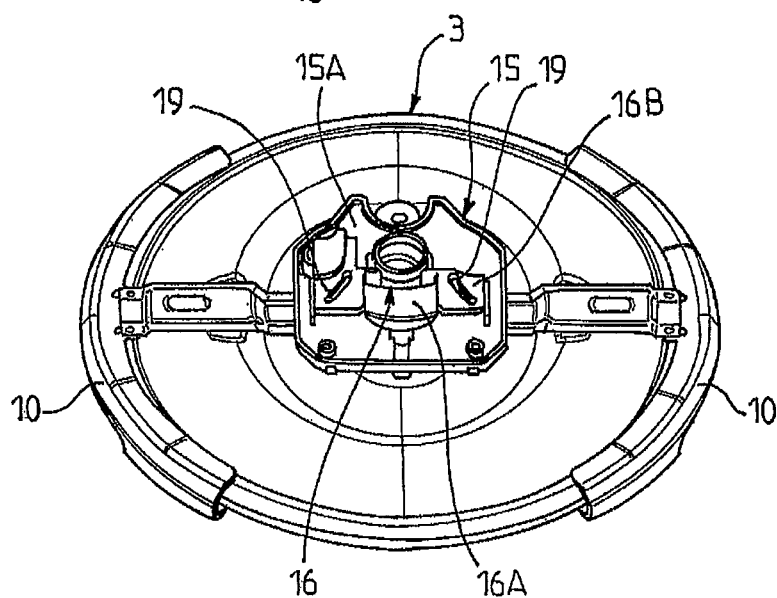

Opening and closure of the household-use pressure cooking utensil of the invention operates as follows:

In order to be able to put food in the previously closed utensil, the user must firstly take hold of the lid 3 via the raised central zone 25 and exert a radial force on the operating member 16 in the inward direction. This radial force, exerted, for example, by the thumb, causes the operating member 16 to move in translation in a corresponding radial direction and induces the locking members 10, i.e. the jaws in this example, to move from their locking position (FIG. 4) towards their unlocking position (FIG. 5). Once the drive pins 14 have reached their end position shown in FIG. 5 inside the slots 19, the unlocking position shown in FIG. 5 is reached, in which position the jaws are disengaged from the dropped peripheral top edge 9 of the vessel 2, so that the user, who should still be exerting pressure on the operating member 16, can remove the vessel 3.

After placing the food inside the vessel 2 and with a view to closing the vessel 2, the user takes hold of the lid 3 again using the above-described procedure and should, once again, exert inward radial pressure on the operating member 16 using the above-described procedure so that the jaws come to take up their unlocking position.

The user can then merely place the lid on the vessel 2 and release the operating member 16 that returns automatically to its initial position by means of the return force exerted by the resilient return means 17 on the drive arms 11. The locking members 10 thus come automatically to take up their return position in which they come to clamp the dropped peripheral top edge 9 of the vessel 2 so as to ensure that the cooking utensil, which is a pressure cooker in this example, is fully locked.

It should be noted that the use of an annular gasket 4 in which the lips are of good flexibility facilitates bedding-down of the lid 3 when it is placed on the vessel 2, so that the lid 3 comes naturally, under its own weight, to take up a position that is sufficiently low to enable the jaws to clamp the dropped peripheral top edge 9 of the vessel 2. Apart from radially actuating the operating member 16, the user then need exert no particular force, or possibly need exert only a minimum force, e.g. by applying axial and vertical pressure, on the lid 3 that beds down naturally merely by gravity.

Once the cooking has been done, the user can merely unlock the lid by pressing radially on the operating member 16 against the return force exerted by the resilient return means 17. Naturally, if residual pressure remains inside the enclosure, the locking valve 18 is in its high position and comes to block the radial movement of the operating member 16, so that the lid 3 cannot be removed, since the locking members 10 cannot be actuated and are thus constrained to remain in their locking position.

The technical means of the invention thus make it possible to define new control ergonomics for opening and closing a pressure cooking utensil that are particularly simplified in all of their aspects both in terms of construction of the drive train, and in terms of the control actions to be performed by the user.

The invention claimed is:

1. A utensil for cooking food under pressure including at least:
    a vessel and a lid that is designed to be mounted on said vessel to define a sealed cooking enclosure;
    at least one locking member mounted to move on the lid between a locking position in which the lid is locked on the vessel and an unlocking position in which the lid can be taken off the vessel;
    a control device for controlling the movement of said at least one locking member, which the control device includes an operating member suitable for being actuated by a user in such a manner as to cause said at least one locking member to move, said operating member being mounted in such a manner as to able to be moved; wherein
    said at least one locking member is mounted on the lid in such a manner as to be urged by positioning resilient return means towards the locking position so that the locking position corresponds to a rest position of the locking member;
    the operating member is mounted to be drivingly linked to said at least one locking member in a manner such that the operating member takes up a stable rest position corresponding to said locking position and that action by the user on the operating member against action from the resilient return means causes the locking member to move towards the unlocking position, which position is unstable;
    the cooking utensil is provided with at least one locking valve mounted on the lid and suitable, under the effect of the pressure prevailing inside the utensil, for taking up a sealing high position and a leakage low position, said locking valve being mounted so that, when said at least one locking member is in the locking position, said locking valve is free to take up its high position, thereby locking said at least one locking member in the locking position.

2. The utensil according to claim 1, wherein said at least one locking member is mounted to move in radial translation on the lid.

3. The utensil according to claim 1, wherein said at least one locking member is mounted to move in rotation on the lid.

4. The utensil according to claim 1, wherein said operating member is mounted in such a manner as to able to be moved in radial translation on the lid.

5. The utensil according to claim 1, wherein said operating member is mounted in such a manner as to be able to be moved in an axial or inclined direction on the lid.

6. The utensil according to claim 1, wherein said at least one locking member is formed by a jaw.

7. The utensil according to claim 6, wherein the cooking utensil includes at least two jaws mounted diametrically opposite each other on the lid, each of the jaws being secured to a drive arm extending radially towards a center of the lid from the jaw, said resilient return means being interposed between the two drive arms.

8. The utensil according to claim 1, wherein the resilient return means is a traction spring.

9. The utensil according to claim 1, wherein the operating member is a push-button making it possible to cause said at least one locking member to move in an inward radial direction and in an outward radial direction.

10. The utensil according to claim 7, wherein the control device includes a deck on which the operating member is mounted to move in radial translation and cooperates with the drive arms to cause them to move.

11. The utensil according to claim 10, wherein said at least one locking valve is mounted on the lid in such a manner as to prevent the operating member from moving in radial translation when it is in its high position.

12. The utensil according to claim 7, wherein the control device also has a raised central zone for making it easier to take hold of the lid in the hand, in which the zone is in the shape of a knob, in register with and below the operating member.

13. The utensil according to claim 12, wherein the utensil includes a piece of trim covering the drive arms and a deck, and incorporating the raised central zone.

* * * * *